No. 782,257. PATENTED FEB. 14, 1905.
C. LEWIS & A. J. BOSTWICK.
STAKE FOR CARS OR LOGGING SLEIGHS.
APPLICATION FILED MAY 2, 1904.

3 SHEETS—SHEET 1.

WITNESSES
INVENTORS
CUTLER LEWIS
ARTHUR J. BOSTWICK
BY
THEIR ATTORNEYS

No. 782,257. PATENTED FEB. 14, 1905.
C. LEWIS & A. J. BOSTWICK.
STAKE FOR CARS OR LOGGING SLEIGHS.
APPLICATION FILED MAY 2, 1904.

3 SHEETS—SHEET 2.

WITNESSES
M. M. Innis
M. Hagerty

INVENTORS
CUTLER LEWIS
ARTHUR J. BOSTWICK
BY Paul & Paul
THEIR ATTORNEYS

No. 782,257. PATENTED FEB. 14, 1905.
C. LEWIS & A. J. BOSTWICK.
STAKE FOR CARS OR LOGGING SLEIGHS.
APPLICATION FILED MAY 2, 1904.

3 SHEETS—SHEET 3.

WITNESSES
M. M'Innis
M. Hagerty

INVENTORS
CUTLER LEWIS
ARTHUR J. BOSTWICK
By Paul & Paul
THEIR ATTORNEYS

No. 782,257. Patented February 14, 1905.

UNITED STATES PATENT OFFICE.

CUTLER LEWIS AND ARTHUR J. BOSTWICK, OF EAU CLAIRE, WISCONSIN.

STAKE FOR CARS OR LOGGING-SLEIGHS.

SPECIFICATION forming part of Letters Patent No. 782,257, dated February 14, 1905

Application filed May 2, 1904. Serial No. 205,957.

*To all whom it may concern:*

Be it known that we, CUTLER LEWIS and ARTHUR J. BOSTWICK, of Eau Claire, in the county of Eau Claire, State of Wisconsin, have invented certain new and useful Improvements in Stakes for Cars or Logging-Sleighs, of which the following is a specification.

The object of this invention is to provide improved means for loading logs upon a car or sleigh and securing them thereon.

A further object is to provide a stake which can be easily and quickly detached from the holder when it is desired to discharge the load.

The invention consists generally in a stake having a clevis at its upper end, to which one end of a chain is attached, whose other end is connected to the corresponding stake on the opposite side of the load.

Further, the invention consists in providing a pin in the upper end of the stake adapted to enter a socket in a pole that rests upon the upper ends of the stakes on the same side of the load and supports the skids over which the logs are rolled upon the sleigh or car.

Figure 1:
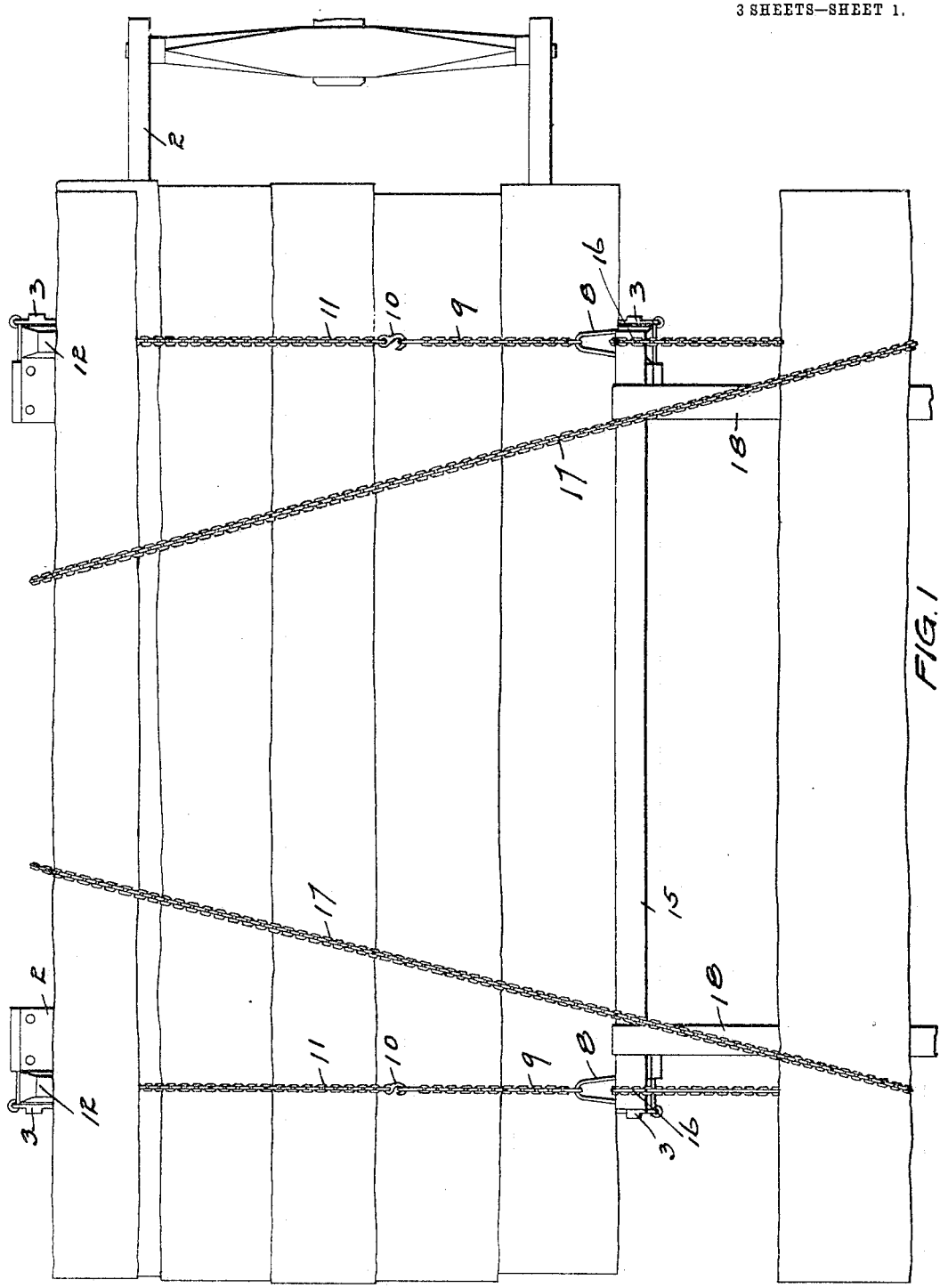
Figures 2, 3:
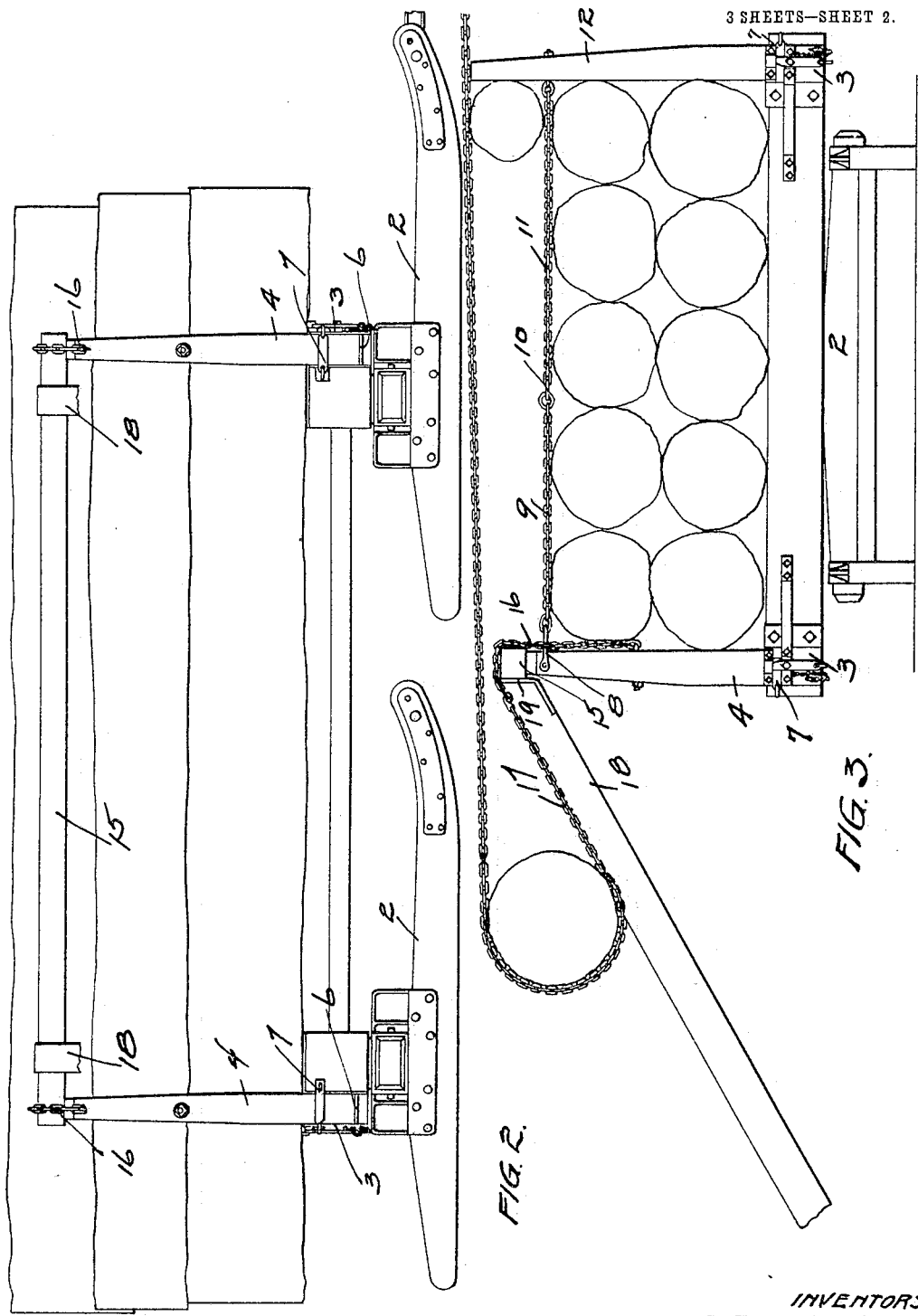
Figure 4:
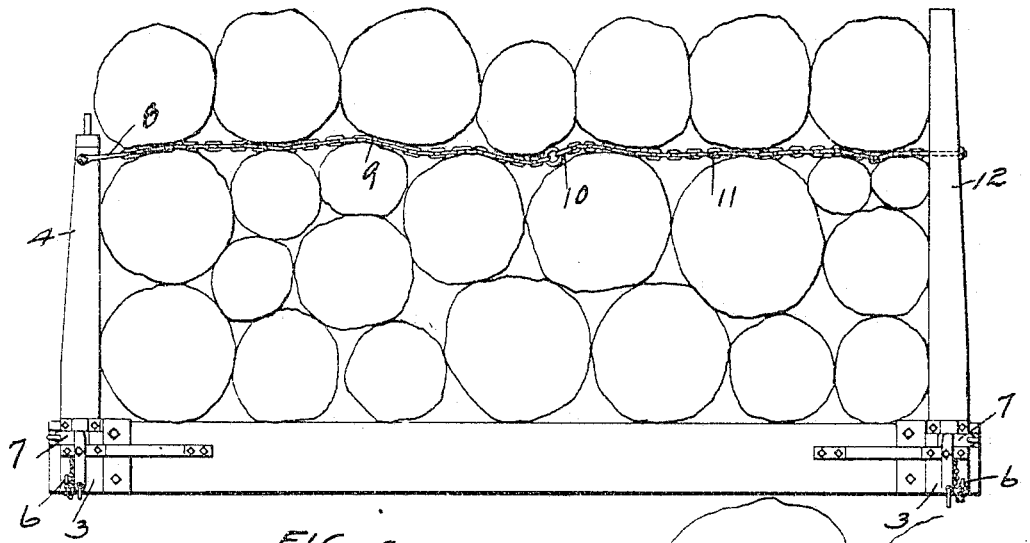
Figure 6:
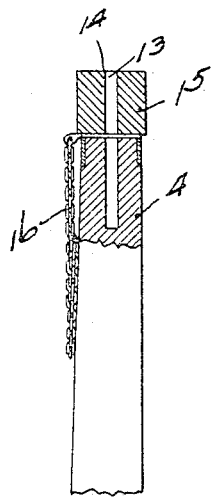
Figure 5:
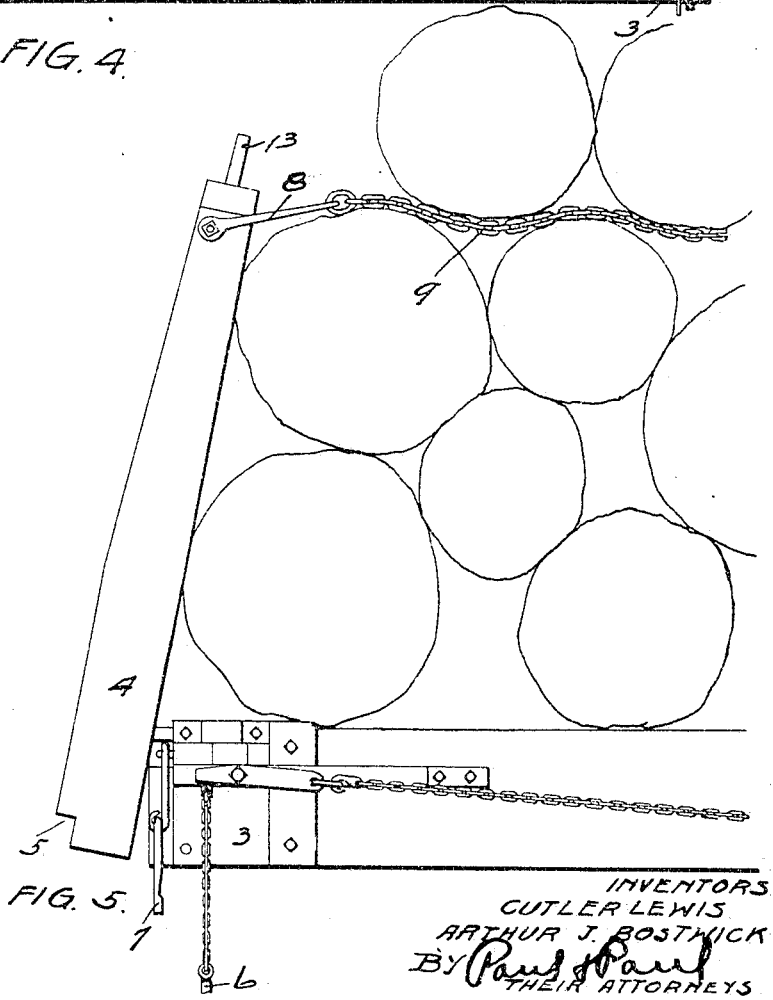

In the accompanying drawings, forming part of this specification, Figure 1 is a plan view showing the manner of loading the logs on a sleigh where our invention is employed. Fig. 2 is a side elevation showing the stakes and the pole that supports the log-skids. Fig. 3 is an end view. Fig. 4 is a view showing the connection between the stakes after the logs have been loaded on the sleigh. Fig. 5 is a detail view showing the stake detached from the holder prior to the discharge of the logs from the load. Fig. 6 is a detail sectional view showing the pin in the upper end of the stake.

In the drawings, 2 represents a logging-sleigh of the ordinary type provided with stake-holders 3, corresponding to those shown and described in our companion application herewith, filed May 2, 1904, No. 205,956.

4 represents the stake, which is substantially the same as the one referred to in said application, except that instead of pivoting the lower end of the stake in the holder, as set forth in said application, we provide a notch 5 therein to receive the pin 6, which prevents the lower end of the stake from passing out through the open side of the holder or box until it is desired to discharge the load. A latch device 7, corresponding to the one shown in my application above referred to, is arranged to extend across the open side of the holder, near the top thereof, and secure the stake firmly in the box. The pressure of the logs on the stake will serve to swing in its lower end against the box and relieve the strain on the pin 6 and permit its ready withdrawal when it is desired to unload the logs. This pin is removed first preparatory to unloading. The locking-latch device is then tripped in the manner described in our companion application and the pressure of the logs will force the stake out of the box, as indicated in Fig. 5. When the stake is discharged, it may be allowed to drop upon the ground, or we may provide at its upper end a clevis 8, that is adapted to swing back and forth around the end of the stake. A chain 9 is attached to this clevis and connected by a hook 10 to a similar chain 11, secured to a stake 12 on the opposite side of the load. This stake 12 is mounted in a stake-holder and is preferably longer than the stake 4 to permit the logs to be piled higher on that side of the sleigh in loading. The chains 9 and 11 are drawn as taut as possible when hooked together over the lower logs on the sleigh and then a series of logs are piled upon the chains, and the weight will serve to draw the chains still tighter and pull together the upper ends of the stakes, preventing them from spreading and also keeping the logs from shifting on the load, while the sleigh is in motion. To facilitate placing the logs on the upper portion of the load, we prefer to provide a pin 13 in the upper end of each stake on the same side of the load adapted to enter a socket 14 in a pole 15, that is arranged horizontally and rests upon the tops of the stakes. Short lengths of chain 16 are secured to the stakes 4, preferably at a point near the middle thereof on their inner faces, and these chains are of sufficient length to pass up over the ends of the pole 15, where they are connected to a chain 17, that passes down around the logs and from thence across the load to the team or other power used for loading. Skids 18 are provided with straps or brackets 19, that rest upon the pole 15, and over these skids the logs are rolled upon the load. After passing over the tops of the stakes 4 the logs drop down upon the chains 9 and 11, draw the same taut, and hold the tops of the stakes securely against spreading.

In unloading the pins 6 are first removed, then the locking-latches are released, and the stakes on that side pressed out of the box by the logs will hang suspended by the chains 9 and 11 and some of the lower logs will roll off beneath the stakes. The upper logs will then follow, passing over the stakes. The chains 9 and 11 are then detached from one another and swung around to the end of the load and the remainder of the logs rolled off in the usual way.

We claim as our invention—

1. The combination, with a stake-holder having an open side, of a stake fitting within said holder and having a notched lower end, a pin passing through the walls of said holder and into said notch, and locking means extending across the open side of said holder near the top thereof.

2. The combination, with the stake-holders, of stakes fitting therein on the same side of the sleigh or car, pins provided in the upper ends of said stakes, a pole having sockets for said pins, and skids resting upon said pole.

3. The combination, with the stake-holders, of stakes fitting therein, a pole resting upon the tops of said stakes on the same side of the load, skids resting upon said pole, chains connected with said stakes below said pole and passing up over the ends thereof, and a loading-chain connected with said stake-chains.

4. The combination, with the sleigh-bunks and the stake-holders secured thereon, of stakes fitting within said holders, those upon one side of the sleigh being shorter than those on the other side, chains connecting the corresponding stakes upon the opposite sides of the sleigh, a pole resting upon the shorter stakes on the same side of the load, stake-chains connected therewith below said pole and extending up over the ends thereof, skids resting upon said pole, and a loading-chain connected with said stake-chains.

5. A logging-sleigh stake, having a pin in its upper end extending lengthwise thereof, for the purpose specified.

In witness whereof we have hereunto set our hands this 19th day of April, 1904.

CUTLER LEWIS.
ARTHUR J. BOSTWICK.

In presence of—
J. AMUNDSON,
A. C. PAUL.